Patented June 4, 1940

2,203,440

UNITED STATES PATENT OFFICE 2,203,440

PROCESS FOR THE SULPHONATION OF UNSATURATED ORGANIC SUBSTANCES

Thomas C. Oliver, Jackson Heights, N. Y., assignor to Charlotte Chemical Laboratories, Inc., Charlotte, N. C., a corporation of North Carolina No Drawing. Application June 18, 1938, Serial No. 214,579

10 Claims. (Cl. 260—504)

The present invention relates to an improved process for the sulphonation of unsaturated organic substances, and, more particularly, to an improved process for the sulphonation of substances of the olefinic and aromatic type or mixtures of such substances together with derivatives of the naphthenic group.

The sulphonation of unsaturated organic substances has been carried out in various ways as is well known to those skilled in the art. However, the prior art processes generally utilized liquid sulphuric acid or flashed oleum to produce sulphuric anhydride which was then used for the sulphonation. Both methods of sulphonation have the drawback that inorganic sulphates are produced which reduce the effectiveness of the sulphonates obtained when the product is utilized in aqueous solutions or emulsions. In addition, the vapors from flashed liquid sulphuric acid or from flashed oleum always contain water and entrained liquid sulphuric acid. It is impossible under industrial conditions to separate this water vapor and entrained liquid sulphuric acid from the SO₃ vapors. Consequently, sulphuric anhydride generated by means of flashing sulphuric acid or by means of flashing oleum always contains a certain modicum of water vapor and liquid sulphuric acid which is carried over into the sulphonation chamber.

I have discovered that the rate of sulphonation can be increased and the color of the sulphonated product can be improved in a remarkably effective and efficient manner.

It is an object of the present invention to provide an improved process for the sulphonation of unsaturated organic substances utilizing anhydrous mixtures of sulphuric anhydride and sulphurous anhydride.

It is another object of the present invention to provide an improved process for the sulphonation of vegetable and animal fats and oils, mineral oils and coal tar products containing substances having unsaturated carbon linkages utilizing anhydrous mixtures of sulphuric anhydride and sulphurous anhydride.

It is a further object of the present invention to provide an improved process for the sulphonation of vegetable and animal oils and fats, mineral oils and coal tar products containing substances having unsaturated linkages employing anhydrous mixtures of sulphuric anhydride and sulphurous anhydride to form sulphonated products soluble not only in oil but also in water.

The present invention also contemplates the provision of an improved process for the sulphonation of vegetable and animal oils and fats, mineral oil and coal tar products containing substances having unsaturated linkages utilizing anhydrous mixtures of sulphuric anhydride and sulphurous anhydride to form sulphonates soluble not only in oil but also in water and of lighter color than prior art sulphonated products.

Other advantages and objects will become apparent from the following description.

In general, my improved process provides for the sulphonation of unsaturated vegetable and animal oils and fats, mineral oils and coal tar products with anhydrous mixtures of sulphuric anhydride and sulphurous anhydride in critically controlled concentration. By reaction with the sulphonating agent, the unsaturated factors or carbon atoms of the unsaturated hydrocarbons are reduced in number with a consequent reduction in the bromine index or number. As the sulphonation of the unsaturated factors or carbon atoms proceeds, the power to absorb bromine is reduced in a direct relation. Thus, when sulphonation is practically complete, the bromine index or number becomes a minimum indicative of the almost complete satisfaction of the unsaturated bonds of the unsaturated hydrocarbon. After sulphonation, the oil insoluble portions of the reaction mass are separated from the oil soluble portions. The oil soluble portions of the reaction mass are then neutralized. This neutralized material may be further refined for the production of products having particular properties by the use of different solvents. In selecting the solvent, care must be exercised to select a sulphonate solvent which either is not a solvent for the unsulphonated oleaginous material or at the most is a poor solvent thereof.

A convenient means for evaluating the degree to which the unsaturation of a hydrocarbon has been lowered or reduced by sulphonation is the determination of the bromine index or number. The bromine index or number refers to the degree of saturation brought about by the contact of an unsaturated substance, for example, a petroleum distillate, with SO₃, whereby the unsaturated factors or carbon atoms are reduced to a greater or lesser extent. As the unsaturated factors or carbon atoms decrease, the bromine index or number decreases, as those skilled in the art readily understand. The reduction of the unsaturated factors may be carried to a degree equivalent to approximate saturation of the hydrocarbon depending upon the time of contact of the unsaturated hydrocarbon with the sulphonating agent. With this relationship as a standard, I have been able to produce sulphonated oils with a marked decrease in bromine index or number by my improved process as hereinafter indicated. Such a condition is indicative of approximate complete saturation of the unsaturated bonds.

In addition to attaining almost complete saturation of the unsaturated bonds, I have found that my improved process enables me to obtain almost complete saturation in a much shorter reaction time than is possible under comparable conditions when the prior art sulphonating agents are employed. For example, when a Columbian distillate is sulphonated, using $SO_3$ produced by flashing oleum, the reaction requires about 180 minutes to reach a high degree of saturation of the double bond in the molecule as evidenced by its having a low bromine index. On the other hand, when the same Columbian distillate is sulphonated in accordance with the principles of my present invention and using an anhydrous gas containing about 5% of anhydrous sulphuric anhydride with a small percentage of anhydrous sulphurous anhydride, a reaction time of only about 80 minutes is required to attain the same saturation of the double bond as mentioned and as measured in the manner outlined immediately above. Of course, the above comparative tests were carried out under standard conditions of temperature, gas pressure and concentration of the sulphonating agent.

In the prior art processes for the sulphonation of petroleum oils, for example, the residual unsulphonated portion of the oil when separated has been of poor color and consequently of lessened market value. I have discovered that not only can these oils be sulphonated to produce a practically completely sulphonated oil that is soluble not only in oil but also in water, but, in addition, the residual unsulphonated oil has a very light color in comparison with the original oil and the residual oils obtained by the prior art processes. The unsulphonated residual oil from a 200 viscosity distillate treated in accordance with the principles of prior art processes has a color of about 4 to about 5 on the American Society for Testing Materials chart, whereas an unsulphonated residual oil from the same source treated in accordance with the principles of the present invention has a color of about 1.5 to about 3 on the A. S. T. M. color chart. In general, I have found that the color of the oil treated in accordance with the principles of the present invention will be reduced from an original color of about 5–7 on the A. S. T. M. chart to a color corresponding to a 2 in the standard A. S. T. M. series. The test method adopted by the A. S. T. M. can be found at pages 775 to 778 of "A. S. T. M. Tentative Standards 1938", and the standard color table to which the foregoing values refer appears therein at page 778.

I have also made the surprising discovery that, when petroleum oil, for example, containing as it does both saturates and unsaturates, is sulphonated in accordance with the principles of the present invention, certain derivatives of the saturates as well as the unsaturates are sulphonated. That is, I believe that in my improved process, side chain groups are "singed off," leaving the residual radicals susceptible to sulphonation. It is my opinion at this time that the remarkable solubility properties of the product of my improved process result from removal of the side chains and subsequent sulphonation and sulphation of the residual nuclei.

In order that those skilled in the art may have a better understanding of my improved process for the sulphonation of vegetable and animal oil and fats, mineral oil and coal tar products, the following illustrative examples are provided.

I have found that an anhydrous gas containing anhydrous sulphuric anhydride and anhydrous sulphurous anhydride in critical concentration and having the oxides in critical proportions produces my unexpected and unusual results. I have found that my improved results may be obtained by employing an anhydrous gas containing up to 12% oxides of sulphur. The ratio of the oxides of sulphur should be controlled for the best results. I have found that anhydrous gas mixtures containing up to 12% total oxides of sulphur, of which the sulphuric anhydride represents about 90% to about 97% and the sulphurous anhydride about 10% to about 3% give satisfactory results. That is, anhydrous gas mixtures containing up to about 10% to about 11.7% of sulphuric anhydride by volume and about 0.3% to about 2.0% sulphurous anhydride by volume and the balance inert gas, give satisfactory results. Furthermore, in my investigations to date, I have found that the conditions of concentration and ratio of oxides of sulphur for optimum, economical operation under present industrial conditions are such that the concentration of total oxides of sulphur is about 5% to about 7.5% of which about 95% is by volume sulphuric anhydride and the concentration of sulphurous anhydride about 5% by volume. However, the concentration of the total oxides of sulphur in the anhydrous mixture of oxides of sulphur may be raised to as much as 12% provided artificial cooling such as provided by refrigeration is employed. On the other hand, concentrations as low as 1% total oxides of sulphur may be employed when the time required to reach the desired degree of sulphonation is of minor importance.

The oil containing unsaturated hydrocarbons which are to be sulphonated is introduced into a suitable reaction vessel provided with the usual cooling means, agitating means and the like. An example of an oil containing unsaturated hydrocarbons which I have sulphonated by my improved process is a petroleum distillate containing naphthenes, paraffins, aromatics and olefins in approximately the following relation: naphthenes, about 25%; paraffins, about 25 to about 30%; aromatics, about 25 to about 30%; and olefins, the balance or approximately 20%. The oil containing unsaturated hydrocarbons and the sulphonating agent form a reacting mass. The reacting mass is maintained at a temperature of about 60° F. to about 90° F. and preferably at a temperature of about 75° F., and the anhydrous mixture of gases containing the oxides of sulphur and, if desired, an inert diluent gas is mixed with the above mentioned gases and then introduced into the liquid oil. Suitable means, well known to those skilled in the art, are provided for the uniform distribution of the gas mixture throughout the liquid oil. While the oxides of sulphur may be employed over a wide range of concentrations, yet the control of the temperature and the speed of the reaction depend upon the concentration of the total oxides of sulphur and ratio of the higher oxide to the lower. While I have found that for satisfactory results a concentration of about 12% total oxides of sulphur is the maximum, greater concentrations may be employed with concomitant difficulties in operation. Likewise, I have found that while practical results are obtained by the use of an anhydrous gas mixture in which the ratio of higher oxide to lower oxide of sulphur is between about 90:10 to about 97:3, nevertheless the ratio of sulphuric anhydride to sulphurous anhydride may be greatly lowered provided suitable means are provided for taking care of the excess sulphurous oxide which would otherwise create a nuisance.

I have found that the gases produced by the carefully controlled catalysis of anhydrous sulphurous anhydride appear to give preferred results. It seems possible that due to the catalytic oxidation of the sulphurous anhydride, a very reactive state of chemical activity is obtained. This is evidenced by the degree of bleaching of the raffinate remaining after the sulphonated bodies have been extracted. What I assume to be the nascent state of the oxides of sulphur produced in this manner brings about the sulphonation of the unsaturates and an unusual bleaching of the saturates. For example, a lubricating cut refined from a Coastal distillate treated in accordance with the principles of the present invention and the sulphonated substances separated has a color of 1.5. The same oil sulphonated with oleum and the sulphonated products separated has a color of 4.

After sufficient of the anhydrous gas mixture has been reacted with the liquid oil to reduce the bromine number to a minimum, the oil soluble reaction products are separated from the oil insoluble reaction products, which may be done by gravity or by introducing a critical amount of water, say, about 1% by weight of the oil. The reaction mass separates into an upper portion containing the residual unsulphonated oil and oil soluble sulphonic bodies, while the lower layer contains the oil insoluble bodies. I separate the layers, discarding the oil insoluble in the form of a sludge, and continue treatment of the oily layer. I then neutralize the oily portion of the reaction mass with a suitable alkaline reagent or base, such as sodium or potassium hydroxide or carbonate or other suitable inorganic or organic bases, such as the anolamines and amines. This oily portion contains the sulphonic bodies which are soluble not only in oil but also in water. To separate the sulphonic bodies from the mass of residual unsulphonated oil and thus obtain pure sulphonated materials or soap stock, I have found that it is desirable to subject the oleaginous solution of sulphonates to the action of various solvents. The choice of a solvent depends upon the properties or characteristics sought in the purified soap stock, the principal desideratum of a suitable solvent being the insolubility or low solubility of the oleaginous medium or unsulphonated residue in the solvent. By judicious selection of the solvent, a soap stock with peculiar properties may be obtained. I have found out that the separation of the soapstock by water in an amount sufficient to throw down the soapstock and equivalent to, say, about 60% to about 100% by weight of the soapstock (on a dry basis) or about 9% to about 15% of the weight of the mixture of soapstock and unsulphonated residue, and subsequent desiccation of the excess moisture or water, is a satisfactory procedure, but primary, secondary and tertiary alcohols with their derivatives may be used for the purpose of separating the soap from the oily body.

For the convenience of those skilled in the art, the following is a partial tabulation of the improved properties of a mineral oil sulphonated in accordance with the principles of the present invention:

(1) Comparative freedom from Glauber or other salts.

(2) Capable of making a true oil in water permanent emulsion as evidenced by the fact that the oil particles are so finely dispersed that the Brownian movement is present.

(3) Has a higher degree of sulphonation than can be obtained through the use of liquid sulphuric acid or oleum or flashed oleum.

(4) The color and brightness of product is greatly improved over that obtained by prior processes. This is true of both the sulphonated body and the residual body after extracting the sulphonates.

(5) The residual oil body, after extracting soapstocks, has a high stability. In one case covering the sulphonation of a 200 viscosity distillate from a Mid-Continent crude oil, the following data were obtained from thorough tests:

(a) Color 1½ on A. S. T. M. scale.
(b) Oxidations by Indiana oxidation test:
  10 mgs. sludge point in 38 hours
  100 mgs. sludge point in 232 hours
(c) Viscosity rise 2 points at 210° F. in 186 hours.

Although the present invention has been described in conjunction with certain preferred embodiments, it is to be understood that variations and modifications may be made as those skilled in the art appreciate. Such variations and modifications are to be considered within the scope of the specification and the purview of the appended claims. Thus, it is to be understood that the present invention also contemplates the sulphonation of "fortified petroleum oil." That is to say, petroleum oil or petroleum oil fractions to which have been added various amounts of sulphonatable aromatics, naphthenes and olefins derived from other fractions of petroleum oil or from the purification of petroleum oil by the selective solvent process, thereby raising the concentration of sulphonatable components, may be sulphonated with anhydrous mixtures of anhydrous oxides of sulphur as described hereinabove.

I claim:

1. The process of anhydrous sulphonation of a liquid body of mineral oil containing at least one hydrocarbon of the group consisting of the olefinic, aromatic and naphthenic types which comprises establishing the aforesaid liquid body of mineral oil, introducing an anhydrous gas mixture containing about 4.7 to about 7.5% anhydrous sulphuric anhydride and about 0.3 to about 0.35% anhydrous sulphurous anhydride into said liquid body of mineral oil in a state of fine division in the absence of substantial amounts of sulphuric acid, oleum and water, maintaining the temperature of said liquid oil body at about 60 to about 90° F., continuing the introduction of said anhydrous gas mixture into the liquid oil body for about 80 minutes to form oil-soluble and oil-insoluble sulphonic compounds mixed with unattacked residual oil, said residual oil containing the oil-soluble sulphonic compounds, separating said residual oil together with said oil-soluble sulphonic compounds from the oil-insoluble sulphonic compounds, neutralizing said oil-soluble sulphonic compounds, treating said residual oil containing neutralized oil-soluble sulphonic compounds with a solvent for said neutralized oil-soluble sulphonic compounds in which the residual oil is no more than slightly soluble, separating said solvent containing the neutralized oil-soluble sulphonic compounds from the residual oil to obtain a mineral oil having a low bromine index and a color of about 1.5 to about 3.0 on the A. S. T. M. scale, and separating said solvent from the oil-soluble sulphonic compounds.

2. The process of anhydrous sulphonation of a liquid body of mineral oil containing at least one hydrocarbon of the group consisting of the olefinic, aromatic and naphthenic types which comprises establishing the aforesaid liquid body of mineral oil, introducing an anhydrous gas mixture containing about 1 to about 12% anhydrous oxides of sulphur in a volume ratio of about 90 to about 97 parts of anhydrous sulphuric anhydride to about 10 to about 3 parts of anhydrous sulphurous anhydride in a state of fine division into said liquid body of mineral oil in the absence of substantial amounts of sulphuric acid, oleum and water, maintaining the temperature of said liquid oil body at about 60 to about 90° F., continuing the introduction of said anhydrous gas mixture into the liquid oil body until said body has a low bromine index to form oil-soluble and oil-insoluble sulphonic compounds with unattacked residual oil, said residual oil containing the oil-soluble sulphonic compounds, separating said residual oil and said oil-soluble sulphonic compounds from the oil-insoluble sulphonic compounds, and separating the residual oil from the oil-soluble sulphonic compounds.

3. The process of anhydrous sulphonation of a liquid body of mineral oil containing at least one hydrocarbon of the group consisting of the olefinic, aromatic and naphthenic types which comprises establishing the aforesaid liquid body of mineral oil, introducing an anhydrous gas mixture containing about 1 to about 12% anhydrous oxides of sulphur into said liquid body of mineral oil in the absence of substantial amounts of sulphuric acid, oleum and water, said anhydrous oxides of sulphur consisting of a preponderance of anhydrous sulphuric anhydride and smaller amounts of anhydrous sulphurous anhydride, continuing the introduction of said anhydrous gas mixture into said liquid oil body until the degree of unsaturation of the hydrocarbons is reduced substantially to a minimum to form oil-soluble and oil-insoluble sulphonic compounds mixed with unattacked residual oil, separating said residual oil together with said oil-soluble sulphonic compounds from the oil-insoluble sulphonic compounds, neutralizing said oil-soluble sulphonic compounds, and separating said neutralized oil-soluble sulphonic compounds from the residual oil.

4. The process of anhydrous sulphonation of a liquid body of mineral oil containing at least one hydrocarbon of the group consisting of the olefinic, aromatic and naphthenic types which comprises passing an anhydrous gas mixture containing about 1 to about 12% anhydrous oxides of sulphur into the aforesaid liquid body of mineral oil in the absence of substantial amounts of sulphuric acid, oleum and water, said anhydrous oxides of sulphur consisting of a preponderance of anhydrous sulphuric anhydride and smaller amounts of anhydrous sulphurous anhydride, to form oil-soluble and oil-insoluble sulphonic compounds mixed with unattacked residual oil, said residual oil containing the oil-soluble sulphonic compounds, separating said residual oil together with said oil-soluble sulphonic compounds from the oil-insoluble sulphonic compounds, and neutralizing said oil-soluble sulphonic compounds.

5. The process of anhydrous sulphonation of a liquid body of mineral oil containing at least one hydrocarbon of the group consisting of the olefinic, aromatic and naphthenic types which comprises passing an anhydrous gas mixture containing about 1 to about 12% anhydrous oxides of sulphur into the aforesaid liquid body of mineral oil in the absence of substantial amounts of sulphuric acid, oleum and water, said anhydrous oxides of sulphur consisting of a preponderance of anhydrous sulphuric anhydride and smaller amounts of anhydrous sulphurous anhydride, to form oil-soluble and oil-insoluble sulphonic compounds, and separating said oil-soluble sulphonic compounds from said oil-insoluble sulphonic compounds.

6. The process of anhydrous sulphonation of a liquid oil body containing at least one hydrocarbon of the group consisting of the olefinic, aromatic and naphthenic types which comprises establishing the aforesaid liquid oil body, introducing an anhydrous gas mixture containing up to about 12% anhydrous oxides of sulphur into said liquid oil body, said anhydrous oxides of sulphur consisting of a preponderance of anhydrous sulphuric anhydride and smaller amounts of anhydrous sulphurous anhydride, continuing the introduction of said anhydrous gas mixture until a high degree of saturation of the hydrocarbons is reached to form oil-soluble and oil-insoluble sulphonic derivatives of said hydrocarbons, and separating out said oil-insoluble sulphonic derivatives.

7. The process of anhydrous sulphonation of a liquid oil body containing at least one hydrocarbon of the group consisting of the olefinic, aromatic and naphthenic types which comprises incorporating with the aforesaid liquid oil body an anhydrous gas mixture containing up to about 12% anhydrous oxides of sulphur, said anhydrous oxides of sulphur consisting of a preponderance of anhydrous sulphuric anhydride and smaller amounts of anhydrous sulphurous anhydride, to form oil-soluble and oil-insoluble sulphonic derivatives of said hydrocarbons, and separating said oil-soluble derivatives from said oil-insoluble derivatives.

8. The process of anhydrous sulphonation of liquid hydrocarbons containing at least one hydrocarbon of the group consisting of the olefinic, aromatic and naphthenic types which comprises reacting at least one of the aforesaid liquid hydrocarbons with an anhydrous gas mixture containing anhydrous sulphuric anhydride and anhydrous sulphurous anhydride to form oil-soluble and oil-insoluble derivatives of said hydrocarbons, and separating said oil-soluble derivatives from said oil-insoluble derivatives.

9. As a new article of manufacture, a 200 viscosity mineral oil distillate having a low bromine index, a color of about 1.5 to about 3.0 on the A. S. T. M. scale, a viscosity rise of about 2 points at 210° F. in 186 hours, a sludge point of about 10 mgs. in 38 hours, and being characterized by properties resulting from treating a liquid body of mineral oil containing at least one liquid hydrocarbon of the group consisting of olefinic, aromatic and naphthenic types with an anhydrous gas mixture containing about 1 to about 12% anhydrous oxides of sulphur in the absence of substantial amounts of sulphuric acid, oleum and water, said anhydrous oxides of sulphur consisting of a preponderance of anhydrous sulphuric anhydride and smaller amounts of anhydrous sulphurous anhydride, to form oil-soluble and oil-insoluble sulphonic compounds mixed with unattacked residual mineral oil, said residual mineral oil containing the oil-soluble sulphonic compounds, separating said unattacked mineral oil together with said oil-soluble sulphonic compounds from the oil-insoluble sulphonic compounds, and separating the mineral oil from the oil-soluble sulphonic compounds.

10. As a new article of manufacture, a mineral oil having a low bromine index and a color of about 1.5 to about 3.0 on the A. S. T. M. scale, said oil producing only small amounts of sludge by the Indiana oxidation tests and being characterized by properties resulting from treating a liquid body of mineral oil containing at least one liquid hydrocarbon of the group consisting of olefinic, aromatic and naphthenic types with an anhydrous gas mixture containing up to about 12% anhydrous oxides of sulphur, said anhydrous oxides of sulphur consisting of a preponderance of anhydrous sulphuric anhydride and smaller amounts of anhydrous sulphurous anhydride, to form oil-soluble and oil-insoluble sulphonic derivatives of said hydrocarbons mixed with unattacked residual mineral oil, and separating said unattacked mineral oil from said oil-soluble and oil-insoluble derivatives.

THOMAS C. OLIVER.